UNITED STATES PATENT OFFICE.

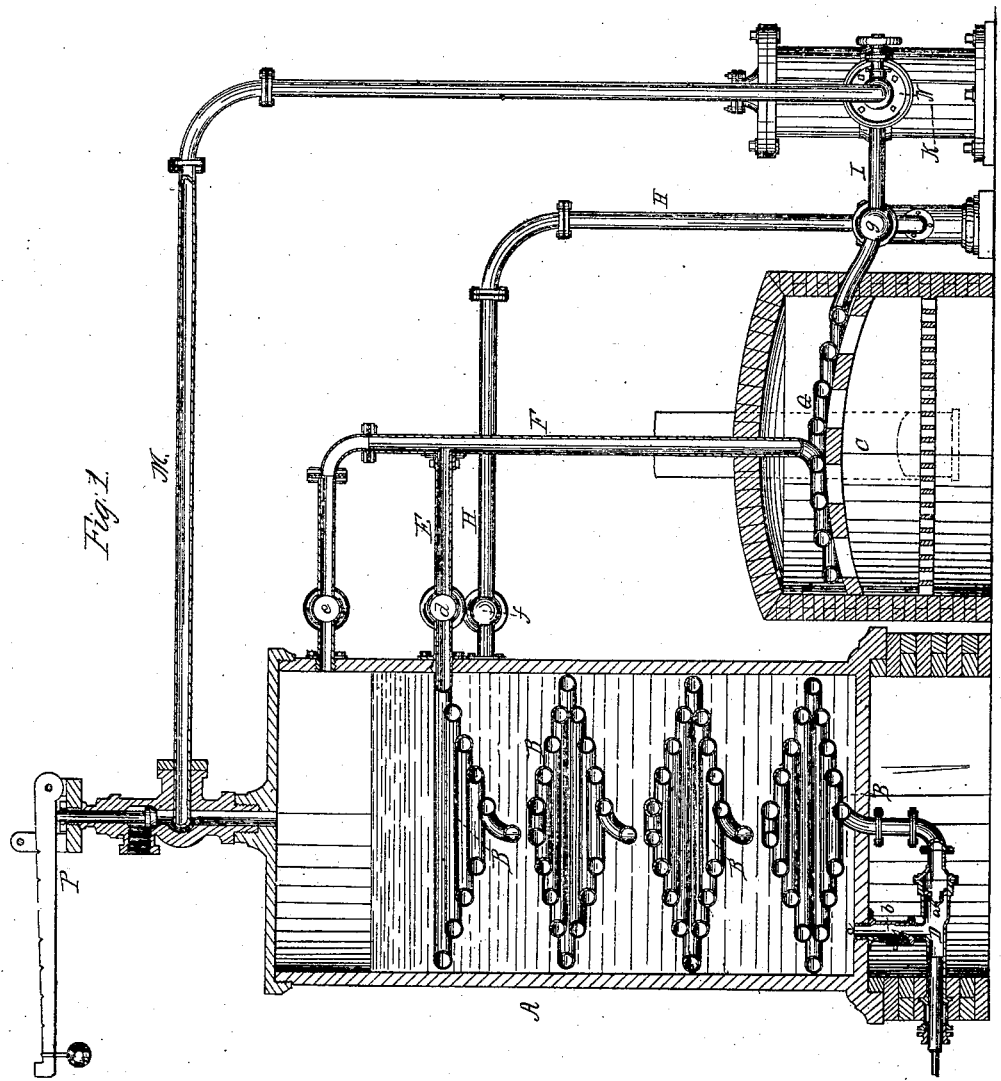

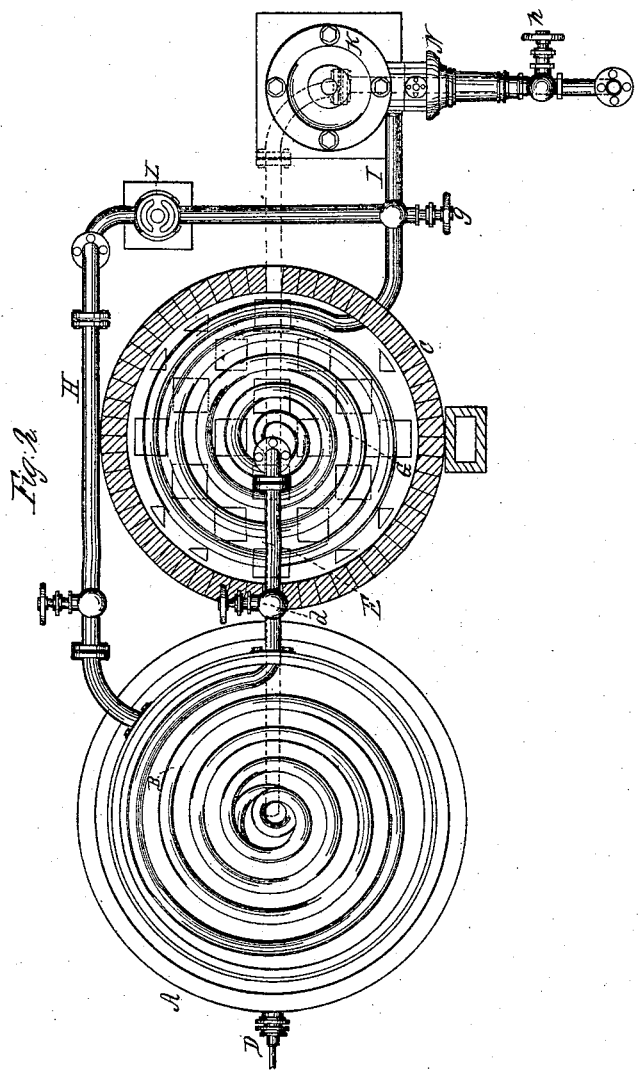

STUART GWYNN, OF NEW YORK, N. Y.

IMPROVED METHOD OF GENERATING STEAM.

Specification forming part of Letters Patent No. 29,482, dated August 7, 1860.

*To all whom it may concern:*

Be it known that I, STUART GWYNN, of New York, in the county of New York and State of New York, have invented a new and useful Method of Generating Steam or Vapor by Latent Heat, applicable to the working of steam or other engines and for other purposes; and I do hereby declare that the following description, taken in connection with the accompanying drawings, is explanatory of the same.

Though my invention is applicable to the generation of different vapors or gases in which the application of artificial heat is employed to convert a fluid from a liquid to an aeriform state, it will be sufficient for the present purpose to confine this description to the generation and working of steam or the vapor of highly-heated water, inasmuch as my invention consists in a novel and advantageous mode of utilizing the latent heat common to all gases or vapors derived as above mentioned, and therefore includes steam, which, being of such general use in the present day, will best serve to illustrate in a familiar manner the principle of my invention, and to show an economical application of my invention I shall here describe it as employed in the working of a steam-engine; but as my invention relates to the more economical generation of steam, &c., it is of course immaterial, excepting for the purpose of illustration, what use the steam as generated is applied to. Used in connection with an engine, however, the latter may then be styled a "differential" or "latent-heat" engine, the appropriateness of which will be found hereinafter explained.

It would be superfluous upon the present occasion to enter into a disquisition of the peculiarities or properties of latent heat. It is an incontrovertible fact that steam raised from boiling water absorbs much more heat than is sensible or discoverable by the thermometer.

It has been estimated that sufficient heat is absorbed during the formation of a certain volume of steam to raise the temperature of a quantity of water equal to that from which the steam was generated 1,000°. Thus the thermometric temperature of steam at any pressure is not the measure of its contained caloric. It also is well known that when steam is reconverted into water the latent heat is liberated and becomes sensible, and, again, though not so generally known, that when steam is allowed suddenly to escape through a large orifice or into a free space there is a great loss of sensible heat, and that vapor in a highly-expanded state contains more latent heat than steam of greater density. The sum of the sensible and latent saturated steam is always nearly the same at all pressures. Likewise that steam may be readily superheated when in an expanded state or free from the presence of water, and that such superheating is not attendant with an increase of pressure corresponding to that it would have at the same temperature over water. These facts being well established and based upon the most competent authorities, the great economy resulting from my invention, as hereinafter described, and the distinguishing characteristics or principle of it, will be readily perceived.

I of course do not pretend to be the first to utilize the exhaust-steam of steam-engines by employing it to heat water which afterward is generated into steam. This is common in a variety of ways to heating feed-water, which, on being pumped into the boiler hot, is afterward more readily convertible into steam. My invention is totally distinct from any such process.

Referring to the accompanying drawings, Figure 1 represents a sectional elevation of an apparatus illustrating my invention in one of its forms or modifications, and Fig. 2 a sectional plan of the same.

In the drawings, A represents a vertical steam-generator with a series of connected double helical tubes or worm B within and running from top to bottom (more or less) of the water-space of the boiler. This boiler A is independent of or separate from the furnace C, which is used to start and keep up the supply of steam, as hereinafter described. The lower end of the worm B is connected with a force-pump D, provided with valves *a b*, the one *b* of which is a delivery-valve and shown arranged within a branch pipe *c*, that is connected with the free water-space of the boiler. The other and upper end of the worm B is connected by a branch pipe E, having a stop-cock *d*, with a vertical pipe F, that unites at its lower end with a regenerator or coil of pipes G, situated over the furnace C, and which vertical pipe F further unites at its upper end, subject to the control of a stop-cock $e$, with the steam-space of the generator A. Branching from the water-space of the generator A is also a pipe H, having a valve or stop-cock $f$ near its junction with the generator, and the lower bend of said pipe H connecting with a pipe I, that joins at its one end the valve-box of the cylinder K of the engine and at its other end the regenerating or superheating coil G, a two-way cock $g$ serving to establish, as required, either free communication between the cylinder-pipe I and coil G, or water-pipe H and coil G. The water-pipe H is shown as furnished with a pump L to produce a mechanical action in the supply to the coil G; but this under the disposition of the pipes and valves or two-way cock $g$, as here shown, may be dispensed with, at least so far as describing the general principles and action of my invention is concerned, and its use supposed to be limited to first filling the boiler with water.

M is a steam-pipe connecting the steam-space of the generator with the valve-box N of the cylinder of the engine, of which $h$ represents the starting-valve.

P is a safety-valve connected with a branch pipe over the top of the generator.

To get the necessary supply of steam to start the engine, the valve $d$ is closed and the valve $f$ opened and the two-way cock $g$ turned to admit water from the generator down the pipe H into the coil G, where it is heated and the steam generated therefrom permitted to pass up the pipe F and through its open valve $e$ into the steam-space of the generator, where it accumulates upon the surface of the water in the latter in a sufficient quantity to start the engine. This being done, the valves $f$ and $e$ are closed, the valve $d$ opened, and the two-way cock $g$ turned to shut off communication with the pipe H and establish communication between the engine and coil G. The steam, after having expanded and done its duty in the engine-cylinder, is passed along the pipe I into the regenerator G, where it becomes superheated, and, escaping up the pipe F, passes along the branch E into the worm B, in descending and working its way through which it gives out its heat to the water in the generator to generate steam therein, and is condensed and pumped back again by the pump D in the form of water into the boiler through the delivery-pipe $c$. In this way the generator once filled with water has its supply kept up by the condensation of the exhaust and superheated steam passing through it, and the same water is used over and over again and the steam kept circulating, as described. The effective force or propelling-power of the steam on the engine will of course be equal to the difference between the pressure of the steam as it is received by the engine from the generator and the pressure of the expanded or exhaust steam in its passage to the regenerator or superheating-coil G. Thus it will be seen that all the latent heat of the steam is made available to the reproduction of steam, and it is here claimed to be new to superheat steam, whether it be exhaust-steam from the engine or otherwise, and then to circulate it through the generator to generate steam by the superheated steam, imparting its latent heat to the water in the generator and being condensed to feed the generator with water.

If desired, the steam may be superheated, after leaving the boiler and before use in the working-cylinder, to such a degree as that after expansion in the working-cylinder it is still of temperature sufficient without afterward superheating it to reproduce in the manner described steam in the generator of proper working-tension; or the steam from the working-cylinder may be passed direct into and through the worm in the boiler and condensed therein and made to give out its latent heat to the water in the boiler, and a portion of water in the upper part of the boiler (where there is most heat) be passed by a pump or otherwise through the superheating-coil G and made so hot as to flash into steam of the required tension on passing out of a suitably-perforated hollow plate in the upper part of the generator; or, again, the regenerator or superheating contrivance may be arranged in the upper part of the boiler or generator and the exhaust-steam from the engine passed through a worm in the boiler, as before, to part with its latent heat to the water in the boiler, and the water in rising in the boiler round the regenerator becoming superheated and flashing again into steam of the necessary tension.

I claim as new—

In the generation of steam or other vapors, reproducing it after performance of its duty by condensing it in the generator which served to produce it, and employing a regenerator or superheater for operation in concert with the boiler, in the manner described, whereby the latent and sensible heat of the steam is made available to the reproduction of steam and the latter, though circulated out of and back through the boiler, kept at a proper working-tension.

In testimony whereof I have signed my name to this specification before two subscribing witnesses.

STUART GWYNN.

Witnesses:
 EDWARD HAMILTON,
 JOHN G. LOCKE.